United States Patent
Klimetschek et al.

(10) Patent No.: US 9,424,275 B2
(45) Date of Patent: Aug. 23, 2016

(54) METHODS AND SYSTEMS FOR CLONING A CLOUD NODE

(71) Applicant: Adobe Systems Incorporated, San Jose, CA (US)

(72) Inventors: Alexander Klimetschek, Berlin (DE); Anthony Lam, Fremont, CA (US); Lars Trieloff, Potsdam (DE); Matt Poling, San Jose, CA (US)

(73) Assignee: Adobe Systems Incorporated, San Jose, CA (US)

(*) Notice: Subject to any disclaimer, the term of this patent is extended or adjusted under 35 U.S.C. 154(b) by 59 days.

(21) Appl. No.: 13/655,863

(22) Filed: Oct. 19, 2012

(65) Prior Publication Data

US 2014/0114921 A1    Apr. 24, 2014

(51) Int. Cl.
*G06F 17/30* (2006.01)

(52) U.S. Cl.
CPC .............. *G06F 17/30212* (2013.01)

(58) Field of Classification Search
None
See application file for complete search history.

(56) References Cited

U.S. PATENT DOCUMENTS

| | | | |
|---|---|---|---|
| 7,720,815 B1* | 5/2010 | Jagannathan | 707/640 |
| 8,626,944 B2* | 1/2014 | Cherkasova | 709/236 |
| 2009/0030986 A1* | 1/2009 | Bates | 709/205 |
| 2010/0274762 A1* | 10/2010 | Murphy | G06F 11/1446 707/636 |
| 2012/0036106 A1* | 2/2012 | Desai | G06F 11/2094 707/645 |
| 2013/0179560 A1* | 7/2013 | Kumar et al. | 709/224 |
| 2013/0198368 A1* | 8/2013 | Patterson | H04L 67/101 709/224 |

OTHER PUBLICATIONS

Cisco ASA 5500 Series Command Reference, copyright 2011, retrieved on Mar. 4, 2014, retrieved from the Internet <URL: http://www.cisco.com/c/en/us/td/docs/security/asa/asa82/command/reference/cmd_ref.pdf>.*

* cited by examiner

*Primary Examiner* — Tyler Torgrimson
(74) *Attorney, Agent, or Firm* — Kilpatrick Townsend & Stockton LLP (57) ABSTRACT

Systems and methods for cloning a cloud node are disclosed. For example, one disclosed method for cloning a cloud node comprises identifying changes during editing of content over a predetermined interval in an author node, compiling, via a replication agent of the author node, all changes of the content identified during the predetermined interval, all of the changes compiled in a replication queue maintained by the replication agent, and at the end of the predetermined interval, providing all of the changes of the content identified during the predetermined interval from the replication queue to both the publisher node and a clone of the published node.

18 Claims, 6 Drawing Sheets

METHODS AND SYSTEMS FOR CLONING A CLOUD NODE

FIELD

The present disclosure generally relates to cloud computing and more specifically relates to cloning a cloud node.

BACKGROUND

Cloud computing has become a more prevalent technology and provides users with computing functionality or data storage as a service, rather than via the purchase of a software application or computer hardware for installation in the user's own computer system. Users of cloud computing services are typically provided with access to the desired functionality over a network connection to a cloud service provider (CSP), which offers the desired services to the user. For example, a user may obtain storage space within a cloud environment, such as by purchasing access rights to the storage space from a CSP, though a user may also construct and configure his own cloud environment. The user may then use the storage space by accessing the cloud environment rather than a specific server. The CSP typically manages the details of where data is physically stored, maintaining storage quotas, and performing data backups. Cloud environments provide advantages in that the service(s) requested by the user may be accessed from multiple locations and may provide a more cost-effective way to add redundant data storage or computing capacity than buying and maintaining additional computers.

SUMMARY

Embodiments involve cloning a cloud node. For example, one disclosed embodiment involves identifying changes during editing of content over a predetermined interval in an author node, wherein an unchanged version of the content without the changes is separately published as a website by at least a publisher node; compiling, via a replication agent of the author node, all changes of the content identified during the predetermined interval, all of the changes compiled in a replication queue maintained by the replication agent; and at the end of the predetermined interval, providing all of the changes of the content identified during the predetermined interval from the replication queue to both the publisher node and a clone of the published node created by cloning the publisher node, wherein each of the publisher node and clone of the publisher node publish a changed version of the content based at least in part on the unchanged version of the content and the replication queue.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Example embodiments are described herein in the context of systems and methods for cloning a cloud node. Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

The methods and systems disclosed herein facilitate the automatic updating of clones of website publishing nodes such that the clones are easily updated based on changes made to the website content where the changes are made at a separate authoring node. Changes over a predetermined interval are tracked in the authoring environment and distributed for use by both publisher nodes and clones of the publisher nodes. The changes are provided at the end of the predetermined interval for use by the publishing and clone nodes. In one example, a user uses an authoring node to edit website content to update a website that is already published. While the editing occurs at the authoring node, an unedited copy of the website is provided to requesting website users by at least a publishing node. At a predetermined interval, changes to the content that have been compiled at the authoring node are provided for use by both the publishing node and a clone of the publishing node. The publishing node and the clone of the publishing node each separately use the changes to provide the changed version of the website. For example, each of the publishing nodes may use an unedited version of the website that each stores and apply edits from the changes provided from the authoring node to produce a changed version of the website that is in turn provided by each of the publishing node and the clone to respective website requesters.

In the above example, it may be advantageous that a single instance of the changes can be distributed to multiple nodes, i.e., to the publishing node and one or more clones of the publishing node. In addition, it may be advantageous that changes are collected over a predetermined interval and distributed at the end of that interval. Use of a predetermined interval and/or distributing changes simultaneously to publishing nodes and associated clones may simplify, help ensure consistency, and reduce the time required in the updating of websites that are being provided via publishing nodes and clones.

Figure 1A:
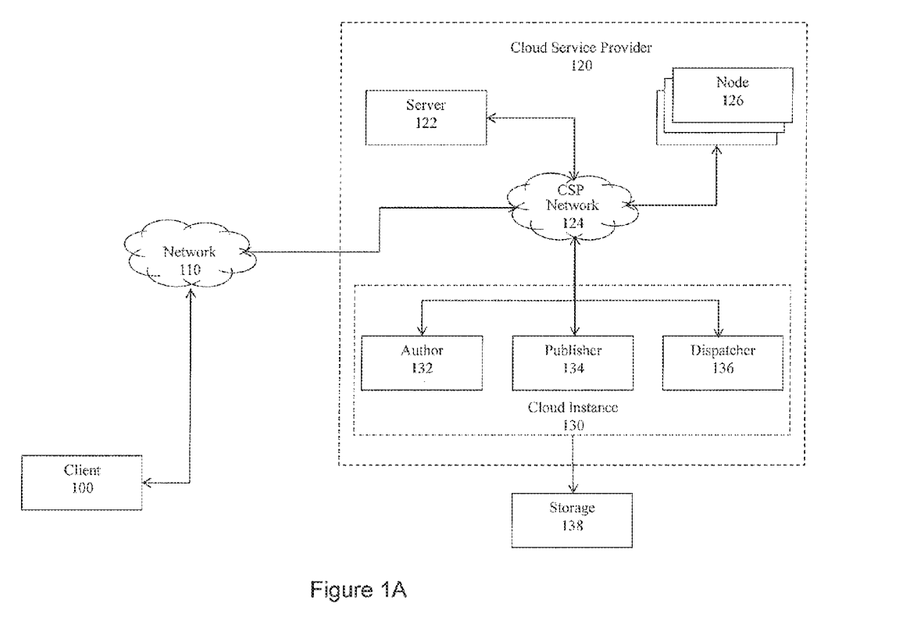
FIGS. 1A and 1B show systems for cloning a cloud node according to embodiments of this disclosure.

In one illustrative embodiment, a cloud instance has a number of nodes, including an authoring node, a publisher node, and a dispatcher node. In this embodiment, the authoring node includes software and tools to allow a user to develop and test new web content, such as new websites or web applications. The publisher node provides access to web content developed on an authoring node that has been "published" and made available for access on the Internet. The dispatcher node provides load balancing, filtering, security, and/or caching functionality. For example, if the cloud instance is later expanded to include multiple publisher nodes to accommodate increased traffic to a website, the dispatcher can provide load balancing between the multiple publisher nodes. FIG. 1A, which will be discussed in more detail below, shows an example configuration of such a cloud instance 130 that includes an authoring node 132, a publisher node 134, and a dispatcher node 136.

In one illustrative embodiment, a clone of the publisher node is created by cloning the publisher node and directly synchronized with a replication queue of the authoring node. The clone of the publisher node may be created by using a backup copy of a published changed and/or unchanged version of content and associating the clone of the publisher node with a replication queue. The clone of the publisher node is synchronized quickly to effectively reduce the time needed to ensure consistency and enhance the computing capacity of the website.

In an embodiment, changes or edits made to content in an author node may be monitored for a predetermined interval. The changes made to the content may be identified over a predetermined interval. The predetermined interval may be any time interval. For example, the predetermined interval can be 10 minutes, 30 minutes, 60 minutes, 1 week, 1 month and the like. The predetermined interval may have a beginning and an end. The predetermined interval may be defined using any manner. In an example, a user of cloud management software tool may define the predetermined interval using a graphical user interface.

A replication agent of the author node may compile all changes to the content. The replication agent may compile the changes during editing of the content over a predetermined interval. In some embodiments, changes to the content may be provided from the author node to the replication agent. The replication agent may have a replication queue. The replication queue may provide all of the changes to the content to the publisher node. In some embodiments, the replication queue may provide all of the changes to the content to a network address associated with the publisher node or a clone of the publisher node. The replication queue may provide the changes to the content to the network address at the end of the predetermined interval. The network address may be a valid IP address or an invalid IP address. The publisher node and/or a clone of the publisher node may publish a changed version of the content. The published changed version of the content may be based at least in part on the unchanged version of the content and the replication queue.

In an embodiment, a publisher node may provide a published unchanged version of the content and/or a published changed version of the content to a storage module. The publisher node may contain unchanged and changed content generated by the author node. For example, the unchanged and changed content generated by the author node may be a web-based programming language, such as HTML, JavaScript and the like, and the published node may run the content to create a resulting webpage published on the Internet. The published unchanged or changed version of the content may be monitored for the predetermined interval.

In some embodiments, the publisher node may transfer a published unchanged version of the content and/or a published changed version of the content to a storage module. The publisher node may transfer a published unchanged and/or changed versions of the content to the storage module at the end of the predetermined interval. The storage module may store the transferred published unchanged and/or changed versions of the content. The storage module may be any kind of mechanism capable of storing data. For example, the storage module may be an online storage web service, such as Amazon's Simple Storage Service (Amazon S3®). The storage module may be a location where normal backup and storage of information on the cloud instance is stored. For example, the information stored on the storage module may be copied automatically to the Amazon S3®. The storage module may be part of a cloud instance. In some embodiments, the storage module is separate from the cloud instance. The storage module may communicate with the publisher node using a communication mechanism, such as a communications network.

In some embodiments, a clone of a publisher node may be created. The clone of a publisher node may be created by using the published unchanged and/or changed versions of the content at the storage module and associating the clone of the publisher node with a replication agent or replication queue.

In some embodiments, a user of a cloud management software tool, such as Adobe® CQ cloud manager, may interact with the software tool and request that a clone of a publisher node be created. In some embodiments, a clone of a publisher node may be created without any user interaction. In this embodiment, the cloud management software tool or some third party may request the creation of a clone of a publisher node. The cloud management software tool will generally receive the indication to create a clone of the publisher node. The cloud management software tool, in another embodiment, will institute the creation of a clone of the publisher node on its own.

The cloud management software tool will create a clone of the publisher node. The clone of the publisher node will be added to an existing cloud instance. In some embodiments, the clone of the publisher node will be added to the same cloud instance as the publisher node in which it was or will be cloned. A copy of the published unchanged and/or changed versions of the content may be retrieved by the clone of the publisher node. In some embodiments, the cloud management software tool may retrieve the published unchanged and/or changed versions of the content stored on the storage module. The copy of the published unchanged and/or changed versions of the content of the storage module may be used so it can be installed on the clone of the publisher node. In some embodiments, the stored content of the storage module will be installed by using the cloud management software tool. The stored content may be installed on the clone of the publisher node at once or incrementally.

The replication queue may be associated with the clone of the publisher node. For example, the replication queue may provide all of the changes to the content to a network address associated with the clone of the publisher node. The clone of the publisher node may publish the changed version of the content. In some embodiments, having a publisher node and a clone of a publisher node may be used for load-balancing of the traffic to a particular website.

This illustrative example is given to introduce the reader to the general subject matter discussed herein and this disclosure is not limited to this example. The following sections describe various additional non-limiting embodiments and examples of devices, systems, and methods for cloning a cloud node.

Referring now to FIG. 1A, FIG. 1A shows a system for cloning a cloud node according to one embodiment. In the embodiment shown, the system comprises a client computer 100 that is in communication with a CSP 120 over network 110, which is in communication within a network 124 internal to the CSP. The client computer 100 comprises a processor and a computer-readable medium (not shown). The client computer's processor is in communication with the computer-readable medium and is configured to execute program code stored thereon. For example, in this embodiment, the client computer's processor is configured to execute a standard web browser stored in the processor's computer-readable medium.

The client computer 100 is in communication with the CSP 120 via network 110. In this embodiment the network 110 comprises the Internet; however in other embodiments, the network 110 may comprise any type of network, including local area networks (LANs) and wide area networks (WANs). The network 110 is in communication with the CSP's internal network 124. In this embodiment, the CSP network 124 comprises a LAN, but in other embodiments, the CSP network 124 may comprise any type of network, such as those discussed above. In some embodiments, the CSP network 124, or network 110 or both, may comprise a virtual network, such as a virtual private network (VPN). In some embodiments, the client computer 110 may be directly coupled to the CSP network 124 without the use of another network 110. For example, in one embodiment, a company may provide its own cloud environment on its own internal network 124. In one such embodiment, the cloud environment is made available to one or more client computers 110 located on the same network 124.

Figure 1B:
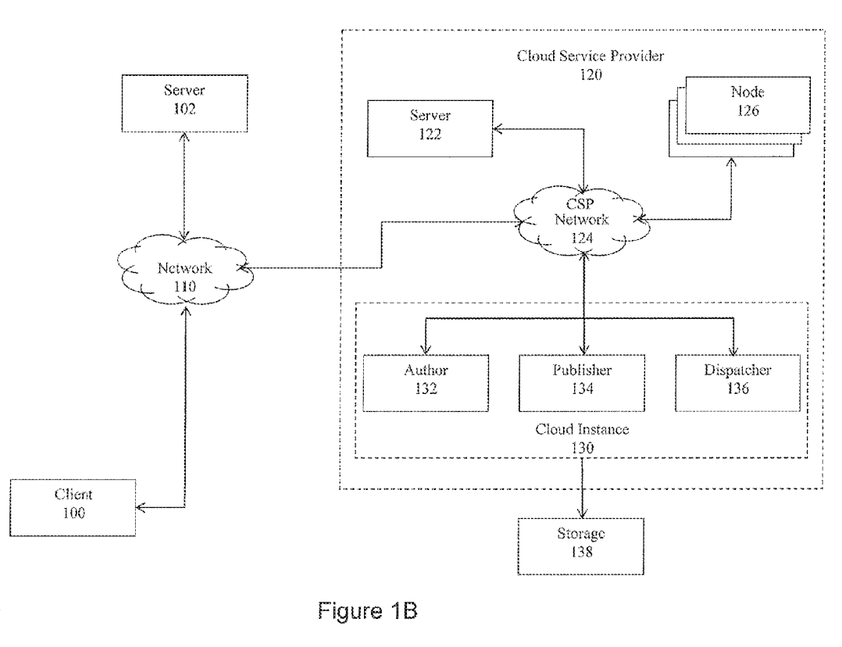

In the embodiment shown in FIG. 1A, the CSP 120 includes a server 122, CSP network 124, a plurality of nodes 126, and a cloud instance 130, which includes an author node 132, a publisher node 134, and a dispatcher node 136. The server 122 is configured to receive communication requests from the client computer 100 and to serve as an interface between the client computer 100 and the CSP 120. For example, in one embodiment, a user may execute a web browser on the client computer 100 and navigate to a webpage provided by the CSP 120 that resides on server 122 that includes a web application embodying one embodiment according to the present disclosure. In another embodiment, a web application is hosted by a third party service provider, such as on server 102 as shown in FIG. 1B. In one such embodiment, the third party service provider provides a web application, which interfaces with one or more CSPs to perform one or more functions or method steps as discussed herein. In another embodiment, a user may select a CSP from a plurality of CSPs at which to create a cloud instance. For example, three CSPs may be available and the user may select a specific CSP as the CSP to host a cloud instance.

In a web-based embodiment, as the user works in the web application, a server, such as server 102 or server 122, may issue one or more commands or requests to a cloud instance or the server 102, 122 may transfer the connection from the client computer 100 to one or more of the nodes within a cloud instance. For example after a user logs into a user session in the web application running on the server 102 or server 122, the user may select an option to use authoring tools resident on the authoring node 132, at which time the server 102 or server 122 transfers the user's session to the authoring tool.

The CSP also provides a plurality of nodes 126 for use by a user. In the embodiment shown in FIG. 1A, a node comprises a discrete computing unit that includes processing capabilities, memory in which to execute one or more applications, and non-volatile storage for persistent storage of data or applications. For example, in one embodiment a node may comprise a discrete physical computer having one or more microprocessors, a quantity of random access memory (RAM), and one or more hard drives. In one embodiment, a node may comprise one of a plurality of virtual servers executing within a single physical computer, where each of the plurality of virtual servers is provided with access to one or more microprocessors, a quantity of RAM, and storage space on one or more hard drives. In some embodiments, a node may be provided by a plurality of physical computers that have been linked together, such as in a cluster. In some embodiments, non-volatile storage for a node may be provided in a separate dedicated storage device, such as within a physical computer having a large quantity of persistent storage or within a storage area network. Still further embodiments of suitable nodes comprise one or more combinations of processing capability, memory for application execution, and memory for persistent storage.

Further, nodes within the CSP's cloud environment may not be identically configured. For example, the CSP 120 may provide a variety of different nodes that may have different configurations. For example, in one embodiment, a CSP 120 may offer three different types of nodes (e.g. small, medium, and large) with increasing amounts of processing capacity, application memory, and persistent storage. Some embodiments may comprise other types of nodes or node combinations. In some embodiments, a CSP may allow a user to select one or more geographic regions in which to configure one or more cloud instances, such as North America, Europe, etc. Such functionality may allow a user to select regions suitable for the anticipated use of the cloud instance or cloud instances.

In the embodiment shown in FIG. 1A and as discussed above, a node represents a discrete computing unit with certain characteristics. A node that is idle and has not been allocated to one of the CSP's customers is available for allocation to a customer and for being configured by the customer for the customer's particular needs. In the embodiment of FIG. 1A, the nodes 132-136 of the cloud instance 130 comprise nodes 126 that have been allocated to the cloud instance and have been configured as an authoring node 132, a publisher node 134, and a dispatcher node 136 by a customer of the CSP 120. At a later time, if the customer decides to discontinue use of the cloud instance 130 or one or more of the nodes 132-136 comprised within the cloud instance 130, the user may release the node (or nodes) to the CSP 120, which may then return it to a pool of idle, unallocated nodes. Thus, the CSP 120 may provide readily available, scalable, configurable processing capabilities for one or more customers.

While the embodiment shown in FIG. 1A comprises three particular types of nodes (author, publisher, dispatcher), other cloud instances may comprise other types of nodes. Each node may be configured according to a user's particular needs and may comprise the same or different functionality. For example, in one embodiment, one node of a plurality of nodes may be configured to perform graphics rendering, another node may be configured to provide content creation application, and a further node to provide video editing functionality. In one embodiment, one or more nodes may be configured as file servers or as storage devices. In another embodiment, the cloud instance must at least comprise an author, publisher and dispatcher node. This cloud instance may also comprise a plurality of nodes in addition to the author, publisher and dispatcher node.

In some embodiments, a system for cloning a cloud node may have a cloud instance that comprises at least three nodes. The system may also have a cloud instance may comprise a fewer number of nodes or a greater number of nodes. Further, in the embodiment shown in FIG. 1A, there are an equal number of author, publisher, and dispatcher nodes shown in the cloud instance 130. In one embodiment, the system may comprise two author nodes, one publisher node, and one dispatcher node.

In some embodiments, a CSP 120 may be a third party CSP that allows one or more users to purchase subscriptions or allow access to CSP cloud services, while in some instances, an entity may create its own cloud environment and act as its own CSP 120, such as to provide cloud services to employees within a company.

In some embodiments, the system comprises a storage module 138. The storage module 138 is in communication with the CSP 120 via network 110. The storage module 138 may communicate with one or more of the nodes of a cloud instance. For example, the storage module 138 may be in communication with an author node 132, publisher node 134, and/or a dispatcher node 136. The storage module 138 may obtain and/or transfer content to one or more nodes. The storage module 138 may receive content from one or more nodes and save or store that content. In some embodiments, the storage module 138 may communicate with a publisher node 134 to obtain content associated with the publisher node. This content may be transferred to the storage module 138 via network 110. The content transferred to the storage module 138 may be published unchanged and/or changed versions of the content. The content may be transferred before, during, or at the end of the predetermined time interval. The published changed version of the content transferred to the storage module 138 may reflect changes that have happened to the content during the predetermined time interval, in some embodiments, the storage module 138 may obtain and store a backup of the one or more nodes and/or the entire system. The backup may include binaries, application code, configurations and the like. Such a backup may occur at the predetermined interval or some other time interval.

The storage module 138 may store or maintain a backup copy of the content of the publisher node 134. In some embodiments, a copy of the content of the publisher node 134 is retrieved from storage module 138 to the CSP 120 or provided to the CSP 120. In this embodiment, the copy of the content of the publisher node 134 is retrieved or provided to help create a clone of a publisher node 134. The content may be an unchanged and/or changed version of the content. For example, when a clone of the publisher node 134 is requested by a user or by the system a copy of the content on the storage module 138 is retrieved or Obtained to help create the clone of the publisher node. The clone of the publisher node is created and the content from the publisher node 134 is configured and installed on the clone of the publisher node. In some embodiments, the files are saved on the storage module in a data compression and archiving format, such as .zip. After the files are retrieved or obtained from the storage module, the files are opened using the appropriate program necessary to open and install contents of the data file.

Figure 2:
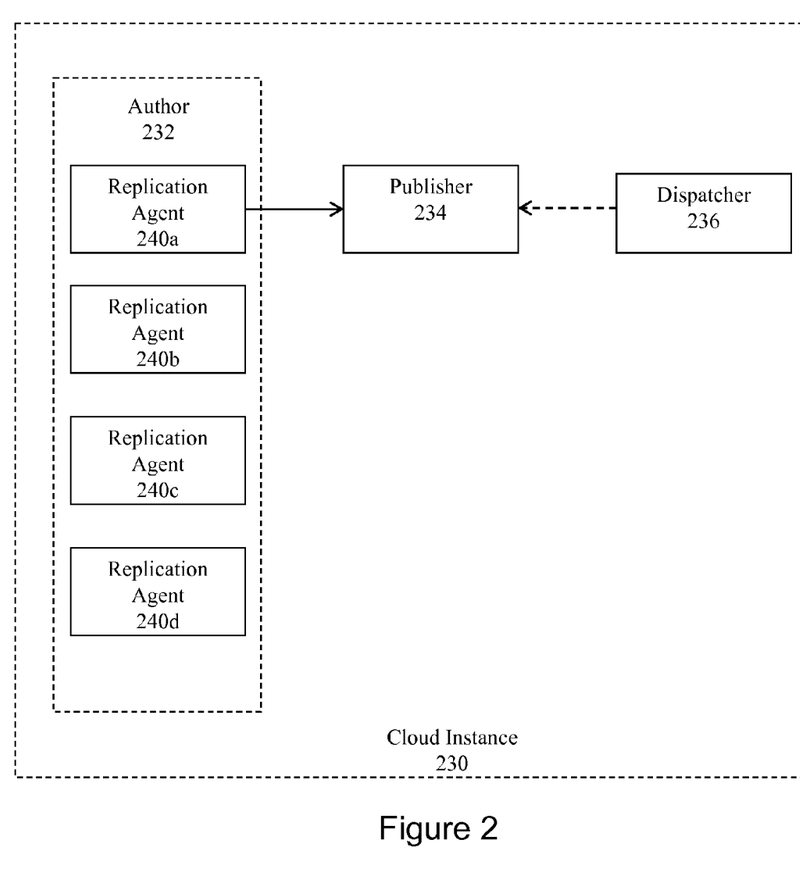
FIG. 2 shows a system for cloning a cloud node according to embodiments of this disclosure.

Referring now to FIG. 2, FIG. 2 shows a system according to one embodiment of this disclosure. In particular, FIG. 2 illustrates a cloud instance 230 according to one embodiment of this disclosure. As illustrated in the embodiment, the cloud instance 230 includes an author node 232, a publisher node 234, and a dispatcher node 236. The author node 232, publisher node 234 and dispatcher node 236 function similarly to the author node, publisher node and dispatcher node of FIG. 1. FIG. 2 is a detailed illustration of the cloud instance of FIG. 1. In particular, FIG. 2 provides a detailed view of the author node of FIG. 1.

The author node 232 has replication agents 240*a*-240*d*. In some embodiments, the author node 232 may monitor and/or accumulate changes to content. The changes to the content may occur during a predetermined time interval. For example, the author node 232 may observe whether any line or portion of the code on the author node has been modified or edited. Any modified or edited changes to the code on the author node may be flagged or identified as being changed content. In some embodiments, the replication agent 240*a*-240*d* may compile all changes to the content. The replication agent 240*a*-240*d* may compile the changes during editing of the content over a predetermined interval. In some embodiments, identified changes to the content are provided from the author node 232 to the replication agent 240*a*-240*d*. The author node 232 may provide the changes periodically to the replication agent 240*a*-240*d* during the predetermined time interval. In some embodiments, the author node 232 may provide the identified changes to the content to the replication agent 240*a*-240*d* at or near the end of the predetermined time interval. It is also contemplated that the replication agent 240*a*-240*d* may be part or independent of the author node. The replication agents 240*a*-240*d* may be used to send or receive data.

In some embodiments, each replication agent 240*a*-240*d* may have a replication queue. The replication agent 240*a*-240*d* may provide changes to the content of the author node to the replication queue during the predetermined time interval. In some embodiments, the replication agent 240*a*-240*d* may compile all of the changes to the content during the predetermined time interval and provide the changes to the replication queue at the end of the predetermined time interval. The replication queue may provide all of the changes to the content to the publisher node. The replication queue may also provide the changes to a clone of the publisher node. In some embodiments, the replication queue may provide all of the changes to the content to a network address associated with the clone of the publisher node. In some embodiments, the changed version of the content may be provided to a valid IP address. For example, the changed version of the content, which is based at least in part on the unchanged version of the content, may be published to an IP address associated with a publisher node. In some embodiments, the changed version of the content may be provided to an invalid IP address. The changed content may be provided to an invalid IP address until the clone of the publisher node receives a valid IP address. In some embodiments, the replication queue may have a disabled flag that may block providing changes to the content until a clone of the publisher node is created. In some embodiments, the replication agent 240*a*-240*d* may publish the changed content with or without providing changed content to the replication queue.

The publisher node 234 and/or the clone of the publisher node may publish an unchanged version of the content. The publisher node 234 and/or the clone of the publisher node may publish a changed version of the content. The changed version of the content published by the publisher node 234 and/or the clone of the publisher node may be based at least on the unchanged version of the content and the replication queue. The dispatcher node 236 provides load balancing, filtering, security, and/or caching functionality between the publisher node 234 and the clone of the publisher node.

Figure 3:
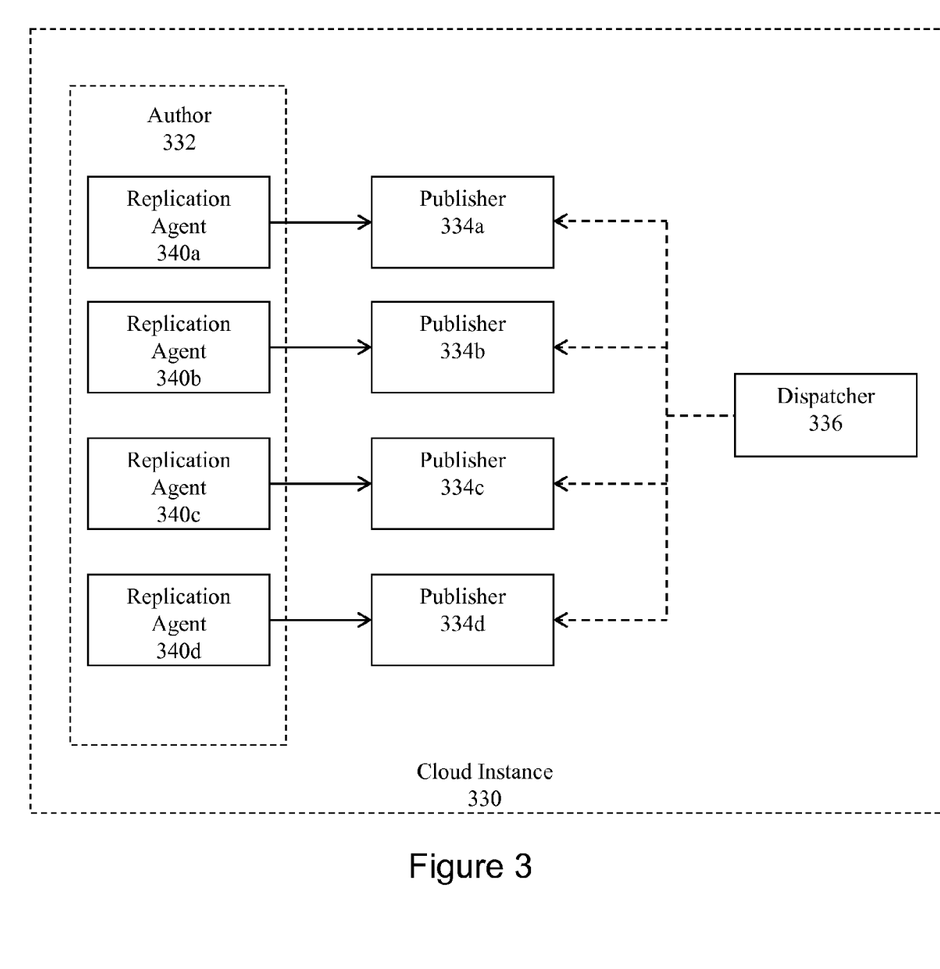
FIG. 3 shows a system for cloning a cloud node according to embodiments of this disclosure.

FIG. 3 illustrates a system for cloning a cloud node according to embodiments of this disclosure. In particular, FIG. 3 illustrates a cloud instance 330 having an author node 332 with multiple replication agents 340*a*-340*d*, publisher nodes 334*a*-334*d* and a dispatcher node 336.

The replication agents 340*a*-340*d* function similar to the replication agents described with respect to FIG. 2. The replication agent 340*a*-340*d* may compile all changes to the content. The replication agent 340*a*-340*d* may compile the changes during editing of the content over a predetermined interval. The replication agents 340*a*-340*d* may receive changes to content from the author node 332. The changes to the content may occur during a predetermined time interval. For example, the author node 332 may observe whether any line or portion of the code on the author node has been modified or edited. Any modified or edited changes to the code on the author node may be flagged or identified as being changed content. Each replication agent 340*a*-340*d* has a replication queue that receives the changes to the content.

As illustrated in FIG. 3, each of the replication agents 340*a*-340*d* is associated with a publisher node 334*a*-334*d*. In some embodiments, each replication queue of a replication agent 340*a*-340*d* is associated with a publisher node 334*a*-334*d*. In some embodiments, the publisher node 334*a* is the original publisher node and the other publisher nodes 334*b*-334*d* are clones of the original publisher node 334*a*.

The replication queue of each replication agent 340*a*-340*d* may provide all of the changes to the content to a network address associated with a respective publisher node or clone on of a publisher node. For example, the replication queue of replication agent 334*b* may be associated with publisher node 334*b* and provide all of the changes to the content to a network address of publisher node 334*b*. In some embodiments, the network address of the publisher node or clone of the publisher node may be a valid or an invalid IP address. The dispatcher node 336 may provide load balancing among the multiple publisher nodes 334*a*-334*d* that are used to maintain and operate a website.

Figure 4:
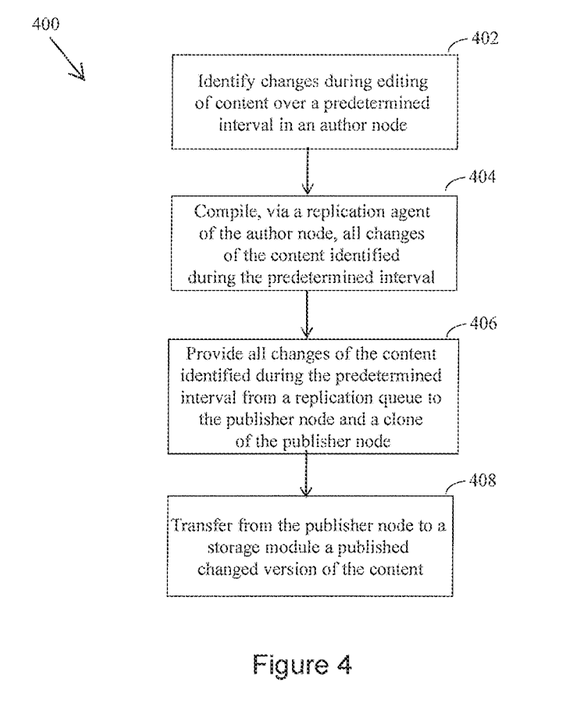
FIG. 4 shows a method for cloning a cloud node according to embodiments of this disclosure.

Referring now to FIG. 4, FIG. 4 shows a method 400 according to one embodiment of this disclosure. The method 400 of FIG. 4 will be described with respect to the system shown in FIG. 1A, but is not restricted to use only on the system of FIG. 1A. Other systems according to this disclosure are also suitable for performing the method 400 of FIG. 4, such as the embodiment shown in FIGS. 1B, 2 and 3. The method 400 described in FIG. 4 is embodied within a software application written in program code configured to be executed by a processor.

The method begins in block 402 where changes during editing of content over a predetermined interval in an author node are identified. An unchanged version of the content without the changes is separately published as a website by a publisher node. The predetermined interval may be any period of time. For example, the predetermined interval may be at least one of 10 minutes, 20 minutes, 30 minutes or 60 minutes. The predetermined interval may be selected by a user of a cloud management software tool, such as Adobe's CQ® cloud manager or some other cloud management software tool. A clone of the publisher node may also separately publish as a website the unchanged version of the content.

At block 404, a replication agent of the author node complies all changes to the content identified during the predetermined interval. All of the changes may be compiled in a replication queue maintained by the replication agent. The cloud management software tool may be used to compile all changes to the content during the predetermined interval. The changes to the content may be compiled during the predetermined interval. In some embodiments, the author node may provide the changes to the content to the replication agent.

At block 406, the replication queue may provide all of the changes to the content identified during the predetermined interval to at least the publisher node. The replication queue may also provide all of the changes to the content to a clone of the publisher node. The changes to content may be provided to a network address associated with the publisher node and a separate network address associated with the clone of the publisher node. The publisher node and the clone of the publisher node may publish a changed version of the content. The changed version of the content may be based at least in part on the unchanged version of the content and the replication queue. At block 408, the publisher node may transfer to a storage module the published changed version of the content. The published unchanged and/or changed version of the content may be provided to the storage module. The publisher node may transfer the published unchanged/changed version of the content during or at the end of the predetermined interval.

Figure 5:
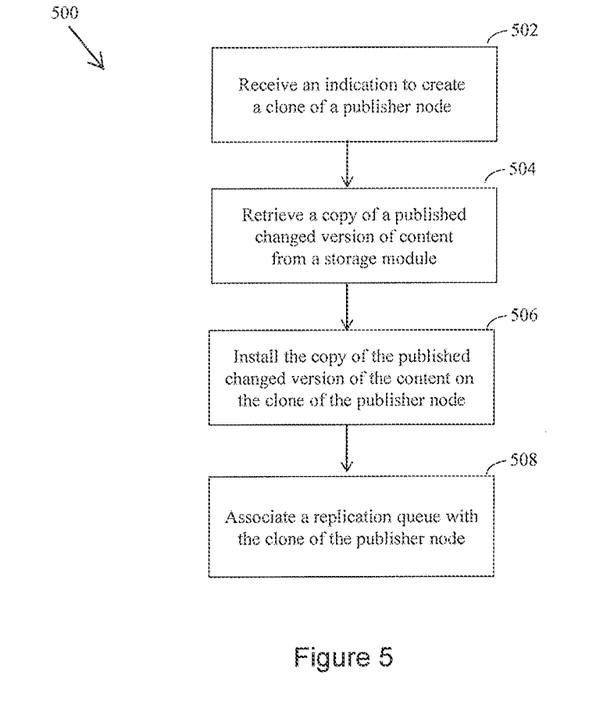
FIG. 5 shows a method for cloning a cloud node according to embodiments of this disclosure.

Referring now to FIG. 5, FIG. 5 shows a method 500 according to one embodiment of this disclosure. The method 500 of FIG. 5 will be described with respect to the system 100 shown in FIG. 1A, but is not restricted to use only on the system 100 of FIG. 1A. Other systems according to this disclosure are also suitable for performing the method 500 of FIG. 5, such as the embodiment shown in FIGS. 1B, 2 and 3. The method 500 described in FIG. 5 is embodied within a software application written in program code configured to be executed by a processor.

The method describes creating a clone of a publisher node by using the published unchanged and/or changed versions of the content at the storage module and associating the clone of the publisher node with a replication agent or replication queue. The method begins in block 502 where an indication to create a clone of the publisher node is received. For example, the cloud management software tool may receive an instruction from a user of the tool to create a clone of a publisher node. The cloud management software tool may create the clone of the publisher node. The clone of the publisher node may be placed on the same cloud instances as the publisher node it is being created to clone. At block 504, a copy of the published changed version of the content may be retrieved from the storage module. The cloud management software tool may communicate with the storage module to retrieve a copy of the published unchanged and/or changed versions of the content.

At block 506, the copy of the published changed version of the content may be installed on the clone of the publisher node. The copy of the published unchanged and/or changed versions of the content may be installed on the clone of the publisher node. In some embodiments, the copy of the published unchanged and/or changed versions of the content may be a .zip file and may be unzipped, extracted and run on the clone of the publisher node. At block 508, a replication queue may be associated with the clone of publisher node. The replication queue may be connected or linked to a network address associated with the clone of the publisher node.

These illustrative examples are given to introduce the reader to the general subject matter discussed here and are not intended to limit the scope of the disclosed concepts. The following sections describe various additional embodiments and examples with reference to the drawings in which like numerals indicate like elements.

General

While the methods and systems herein are described in terms of software executing on various machines, the methods and systems may also be implemented as specifically-configured hardware, such a field-programmable gate array (FPGA) specifically to execute the various methods. For example, embodiments of the methods and systems herein can be implemented in digital electronic circuitry, or in computer hardware, firmware, software, or in a combination of thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

The processor, and the processing, described may be in one or more structures, and may be dispersed through one or more structures. The processor may comprise code for carrying out one or more of the methods (or parts of methods) described herein.

The foregoing description of some embodiments has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Numerous specific details are set forth herein to provide a thorough understanding of the claimed subject matter. However, those skilled in the art will understand that the claimed subject matter may be practiced without these specific details, in other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:
1. A method comprising:
   identifying changes to content that were made during a predetermined interval of time in an author node, wherein an unchanged version of the content without the changes is separately published as a website by a publisher node and a clone of the publisher node created by cloning the publisher node, wherein at consistent periodic intervals of time, changes to the content are identified and compiled for publication to the publisher node and clone of the publisher node;

compiling, via a replication agent of the author node, all changes of the content identified during the predetermined interval of time, all of the changes compiled in a replication queue maintained by the replication agent; and at the end of the predetermined interval of time, providing all of the changes of the content identified during the predetermined interval of time from the replication queue to both the publisher node and the clone of the publisher node created by cloning the publisher node, wherein each of the publisher node and clone of the publisher node publish a changed version of the content based at least in part on the unchanged version of the content and the changes of the content identified during the predetermined interval of time provided by the replication queue, wherein providing all of the changes of the content identified during the predetermined interval of time from the replication queue to the clone of the publisher node when the clone of the publisher node has not yet been created comprises:

attempting to transmit the changes to the content from the replication queue to a network address associated with the clone of the publisher node during a period in which the network address is an invalid IP address, and when the clone of the publisher node receives a valid IP address, transmitting the changes to the content from the replication queue to the valid IP address.

2. The method of claim 1, further comprising:
transferring from the publisher node to a storage module the published changed version of the content.

3. The method of claim 2, wherein cloning the publisher node comprises:
receiving an indication to create a clone of the publisher node;
retrieving a copy of the published changed version of the content from the storage module;
installing the copy of the published changed version of the content on a clone of the publisher node; and
associating the replication queue with the clone of the publisher node.

4. The method of claim 1, wherein the predetermined interval of time is one of 10 minutes, 20 minutes, 30 minutes or 60 minutes.

5. The method of claim 1, wherein providing all of the changes of the content identified during the predetermined interval of time from the replication queue to the clone of the publisher node comprises providing all of the changes to the content to the network address associated with the clone of the publisher node.

6. The method of claim 1, wherein a cloud instance comprises at least the publisher node, the author node, and a dispatcher node.

7. A non-transitory computer-readable medium on which is encoded program code, the program code comprising:
program code for identifying changes to content that were made during a predetermined interval of time in an author node, wherein an unchanged version of the content without the changes is separately published as a website by a publisher node and a clone of the publisher node created by cloning the publisher node, wherein at consistent periodic intervals of time, changes to the content are identified and compiled for publication to the publisher node and clone of the publisher node;

program code for compiling, via a replication agent of the author node, all changes of the content identified during the predetermined interval of time, all of the changes compiled in a replication queue maintained by the replication agent; and program code for, at the end of the predetermined interval of time, providing all of the changes of the content identified during the predetermined interval of time from the replication queue to both the publisher node and the clone of a publisher node created by cloning the publisher node, wherein each of the publisher node and clone of the publisher node publish a changed version of the content based at least in part on the unchanged version of the content and the changes of the content identified during the predetermined interval of time provided by the replication queue, wherein providing all of the changes of the content identified during the predetermined interval of time from the replication queue to the clone of the publisher node when the clone of the publisher node has not yet been created comprises:

attempting to transmit the changes to the content from the replication queue to a network address associated with the clone of the publisher node during a period in which the network address is an invalid IP address, and when the clone of the publisher node receives a valid IP address, transmitting the changes to the content from the replication queue to the valid IP address.

8. The computer-readable medium of claim 7, further comprising:
program code for transferring from the publisher node to a storage module the published changed version of the content.

9. The computer-readable medium of claim 7, wherein cloning the publisher node comprises:
program code for receiving an indication to create a clone of the publisher node;
program code for retrieving a copy of the published changed version of the content from the storage module;
program code for installing the copy of the published changed version of the content on a clone of the publisher node; and
program code for associating the replication queue with the clone of the publisher node.

10. The computer-readable medium of claim 7, wherein the predetermined interval of time is one of 10 minutes, 20 minutes, 30 minutes or 60 minutes.

11. The computer-readable medium of claim 7, wherein program code for providing all of the changes of the content identified during the predetermined interval of time from the replication queue to the clone of the publisher node comprises program code for providing all of the changes to the content to the network address associated with the clone of the publisher node.

12. A system comprising:
a computer-readable medium; and
a processor in communication with the computer-readable medium, the processor configured to:
identify changes to content that were made during a predetermined interval of time in an author node, wherein an unchanged version of the content without the changes is separately published as a website by a publisher node and a clone of the publisher node created by cloning the publisher node, wherein at consistent periodic intervals of time, changes to the content are identified and compiled for publication to the publisher node and clone of the publisher node;

compile, via a replication agent of the author node, all changes of the content identified during the predetermined interval of time, all of the changes compiled in a replication queue maintained by the replication agent; and at the end of the predetermined interval of time, provide all of the changes of the content identified during the predetermined interval of time from the replication queue to both the publisher node and the clone of a publisher node created by cloning the publisher node, wherein each of the publisher node and clone of the publisher node publish a changed version of the content based at least in part on the unchanged version of the content and the changes of the content identified during the predetermined interval of time provided by the replication queue, wherein providing all of the changes of the content identified during the predetermined interval of time from the replication queue to the clone of the publisher node when the clone of the publisher node has not yet been created comprises:

attempting to transmit the changes to the content from the replication queue to a network address associated with the clone of the publisher node during a period in which the network address is an invalid IP address, and when the clone of the publisher node receives a valid IP address, transmitting the changes to the content from the replication queue to the valid IP address.

13. The system of claim 12, wherein the processor is further configured to transfer from the publisher node to a storage module the published changed version of the content.

14. The system of claim 12, wherein the predetermined interval of time is one of 10 minutes, 20 minutes, 30 minutes or 60 minutes.

15. The system of claim 12, wherein the processor being configured to provide all of the changes of the content identified during the predetermined interval of time from the replication queue to the clone of the publisher node comprises being configured to provide all of the changes to the content to the network address associated with the clone of the publisher node.

16. The system of claim 12, wherein a cloud instance comprises at least the publisher node, the author node, and a dispatcher node.

17. The method of claim 1, wherein the compiling of all changes of the content identified during the predetermined interval of time is done without user interaction.

18. The method of claim 1, wherein the author node is in a first cluster of computers on a network and the publisher node is in a second cluster of computers on a network, and the publisher node operates to transfer a connection from a client node to the author node.

* * * * *